Patented Feb. 20, 1951

2,542,936

UNITED STATES PATENT OFFICE 2,542,936

2-METHYL-2-CARBOXY-7-METHOXY-HYDROPHENANTHRENE-(1)-ALKANALS

Karl Miescher and Jules Heer, Basel, Switzerland, assignors to Ciba Pharmaceutical Products, Inc., Summit, N. J.

No Drawing. Application February 24, 1947, Serial No. 730,569. In Switzerland March 7, 1946

4 Claims. (Cl. 260—473)

The present invention relates to the manufacture of hydrophenanthrene monocarboxylic acids and derivatives thereof, particularly lower alkanols.

The present invention starts from hydrophenanthryl-(1)-fatty acids, which contain in the 2-position for example an esterified carboxyl group, a nitrile or an acid amide group, and in addition to these groups, further substituents, for example, in the 2-position, hydrocarbon radicals, such as alkyl radicals, or in the 7-position, hydroxyl groups, or substituents which are convertible into hydroxyl groups, for example etherified or esterified hydroxyl groups. The starting materials can be prepared, among other methods, by the partial hydrolysis of diesters of the corresponding 2-carboxy-hydrophenanthryl-(1)-fatty acids, which latter can themselves be prepared, for example, by the oxidative splitting of the 5-membered ring of 16:17-dihydroxy- or 17-ketosteriods and building up or degrading the products obtained, or by total synthesis. Such dicarboxylic acids are, for example, 7-hydroxy-2-methyl-2-carboxy-1:2:3:4:9:10:11:12-octahydrophenanthryl-(1)-fatty acid, for example, -acetic, -propionic and -formic acid (Marrian and Hazlewood, Journal of the Society of Chemical Industry, vol. 51. II, page 279T [1932]); MacCorquodale, L. Levin, Thayer and Doisy, Journal of Biological Chemistry, vol. 99, page 327 [1933]; and also J. Heer and K. Miescher, Helvetica Chimica Acta, vol. 28, page 156 [1945]; Bachmann, Journal Am. Chem. Soc., vol. 62, page 824 [1940]; Journal Am. Chem. Soc., vol. 64, 974 [1942], 7-hydroxy-2-methyl-2-carboxy-1:2:3:4-tetrahydrophenanthryl-(1)-fatty acid, for example, bisdehydroxymarrianolic acid (MacCorquodale, L. Levin, Thayer and Doisy, Journal of Biological Chemistry, vol. 101, page 753 [1933]; U. S. Patent No. 2,069,096 of August 9, 1933; and also J. Heer, J. R. Billeter and K. Miescher, Helvetica Chimica Acta, vol. 28, page 991 [1945]), α- and β-2-methyl-2-carbomethoxy-1:2:3:4-tetrahydrophenanthryl-(1)-acetic acids (Bachmann, Journal of the American Chemical Society, vol. 62, page 2084 [1940]), also 7-hydroxy-2:13-dimethyl-2-carboxy-hydrophenanthryl-(1)-acetic acid (Δ5:6-3-hydroxy-etio-b'lienic acid).

In accordance with this invention, the carboxyl group of the fatty acid residue may advantageously be converted into the carboxylic acid halide group which latter can then be converted into the aldehyde stage. Thus, for example, the acid halide may be reduced into the aldehyde by means of catalytically activated hydrogen. The aldehyde group may, if desired, thereafter be reduced to a methyl group either directly, for example, by means of zinc and hydrochloric acid, by means of chromium salts or by means of hydrazine and an alkali metal alcoholate, or indirectly by way of the hydrazone, semicarbazone, mercaptal or dihalide.

Any functionally converted carboxyl groups still present, such as nitrile or carbalkoxy groups, or any groups convertible into hydroxyl groups such as esterified or etherified hydroxyl groups, for example alkoxy or acyloxy groups, may if desired be converted into free carboxyl or hydroxyl groups. For this purpose there may be used agents having a hydrolysing action, more especially for the conversion of esters and ethers.

Conversely, if the resulting compounds contain free carboxyl or hydroxyl groups they may be converted into the corresponding esters or ethers. Furthermore, free carboxylic acids may be converted into carboxylic acid salts.

It is known that the 2-carboxylic acid methyl ester of β-7-methyl-bisdehydro-marrianolic acid melting at 111–112° C. can be converted into the active equilenin, and that the inactive isoequilenin can be obtained from the corresponding isomeric α-compound melting at 137–138° C. (see Bachmann, Journal of the American Chemical Society, vol. 62, page 824 [1940]). It is surprising that by the process of the invention the inactive product can be obtained from the β-compound and that the active 7-hydroxy-1-ethyl-2-methyl-1:2:3:4-tetrahydrophenanthrene-2-carboxylic acid (bisdehydro-doisynolic acid) can be obtained from the α-compound.

The products of the invention find application as therapeutic agents or as intermediate products for making such agents.

The following examples illustrate the invention the parts being by weight unless otherwise stated and the relationship of parts by weight to parts by volume being the same as that of the kilogram to the liter:

Example 1

2 parts of dextro-rotary 7-methoxy-2-methyl-2-carbomethoxy-1:2:3:4-tetrahydrophenanthryl-(1)-acetic acid melting at 192° C. and having the Formula I

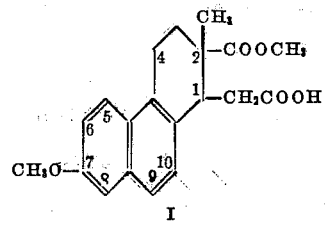

I ("7-methyl-bisdehydro-marrianolic acid monomethyl ester," compare Heer, Billeter and Miescher, Helvetica Chimica Acta, vol. 28, page 1000 [1945]) are dissolved in 4 parts by volume of absolute benzene and gently heated with 2 parts by volume of oxalyl chloride until the evolution of hydrogen chloride ceases. Upon evaporating the reaction mixture, 7-methoxy-2-methyl - 2 - carbomethoxy - 1:2:3:4 - tetrahydrophenanthryl-(1)-acetic acid chloride of the Formula II

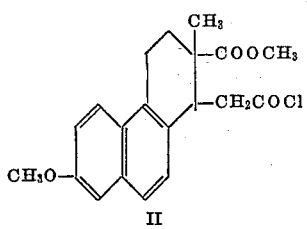

remains behind in the form of a colourless crystalline mass melting at 128–130° C. The purified product melts at 135–136° C.

The resulting acid chloride is dissolved in 15 parts by volume of toluene, and, after the addition of 1 part of palladium-animal charcoal, dry hydrogen is introduced into the mixture at 80–90° C. until hydrogen chloride is no longer split off. The reaction solution is filtered, and the filtrate is evaporated. The aldehyde fraction is separated from the residue by means of the chloride of pyridinium-acetic acid hydrazide. In this manner 7-methoxy-2-methyl-2-carbomethoxy - 1:2:3:4 - tetrahydrophenanthryl - (1)-acetaldehyde of the Formula III

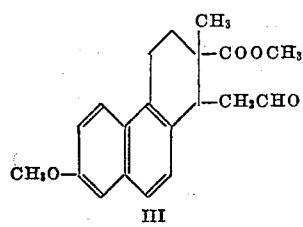

is obtained in good yield. In the pure state it melts at 118–120° C. and its semi-carbazone melts at 192–194° C. with decomposition.

1 part of the aldehyde is heated to boiling for several hours with a mixture of 5 parts by volume of toluene, 65 parts of zinc, 2 parts by volume of water and 6 parts by volume of concentrated hydrochloric acid. The product is taken up in ether, treated with diazo-methane in order to esterify free carboxylic acids which are present, the whole is evaporated to dryness, and the oily residue is purified by recrystallisation or by chromatography over aluminium oxide. In this manner 7-methoxy - 1 - ethyl-2-methyl-1:2:3:4-tetrahydrophenanthrene-2-carboxylic acid methyl ester, namely dextro-iso-methyl-bisdehydro-doisynolic acid methyl ester, melting at 99° C. is obtained in the form of small flat needles. Hydrolysis of the esterified carboxyl group and the methoxy group yields free, dextro-rotary iso-bisdehydro-doisynolic acid melting at 254–256° C. of the Formula IV

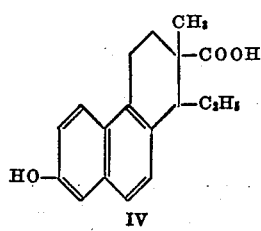

*Example 2*

1.7 parts of racemic α-7-methoxy-2-methyl-2-carbomethoxy - 1:2:3:4-tetrahydrophenanthryl- (1)-acetic acid melting at 137–138° C. (compare Bachmann, Journal of American Chemical Society, vol. 62, page 824 [1940]) are dissolved in 5 parts by volume of benzene and converted into the corresponding acid chloride by means of 3 parts by volume of oxalyl chloride. The crude reaction product is then reduced in 20 parts by volume of toluene with the aid of 1 part of a palladium-barium sulphate catalyst in the manner described in Example 1. Purification with the aid of the chloride of pyridinium-acetic acid hydrazide leads to the isolation of 1–1.2 parts of α-7-methoxy-2-methyl-2-carbomethoxy - 1:2:3:4 - tetrahydrophenanthryl-(1)-acetaldehyde, which forms a semicarbazone melting at 202–203° C.

1 part of the aldehyde so obtained is heated for a prolonged period at 180–200° C. with a mixture of 50 parts by volume of glycol, 2.5 parts of sodium and 0.25 part of hydrazine hydrate. The reaction solution is then poured into water, small quantities of neutral by-products are removed by extraction with ether, and the alkaline solution is acidified. The precipitated 7 - methoxy - 1 - ethyl - 2 - methyl-1:2:3:4 - tetrahydrophenanthrene - 2 - carboxylic acid is advantageously purified by way of its methyl ester. The latter melts at 75–76° C. and upon hydrolysis of the carbomethoxy and methoxy groups, for example, first in alkaline solution and then with pyridine hydrochloride, yields 7 - hydroxy - 1 - ethyl - 2 - methyl - 1:2:3:4-tetrahydrophenanthrene - 2 - carboxylic acid, namely the racemic normal bisdehydro-doisynolic acid melting at 202° C.

*Example 3*

3.5 parts of dextro-rotary 7 - methoxy - 2-methyl - 2 - carbomethoxy - 1:2:3:4:9:10:11:12-octahydrophenanthryl-(1)-acetic acid of Formula V

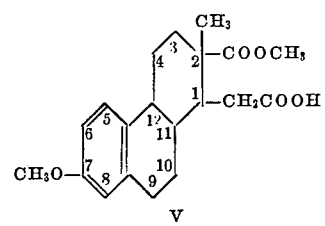

(an oil boiling at 160° C. under 0.1 mm. pressure, and obtained by the oxidative splitting of estrone (see J. Heer and K. Miescher, Helvetica Chimica Acta, vol. 28, page 163 [1945]) by means of potassium hypo-iodite, esterification of the dicarboxylic acid with diazo-methane and semi-hydrolysis of the oily dimethyl ester) are converted in 10 parts by volume of benzene by means of 4 parts by volume of oxalyl chloride into the acid chloride of Formula VI

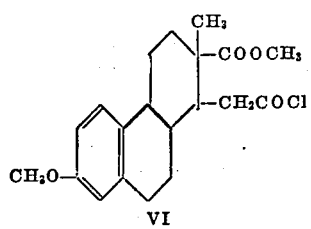

Without further purification the oily crude product is dissolved in 30 parts by volume of xylene, mixed with 4 parts of palladium-animal charcoal, and reduced by passing therethrough a current of hydrogen at 110–120° C. After 1½ hours the reaction ceases. The catalyst is removed by filtration, the whole is taken up in ether, and unreacted carboxylic acid is removed by means of a dilute solution of sodium carbonate. The whole is then evaporated to dryness under reduced pressure, and the aldehyde fraction is separated from by-products in the manner described in the preceding examples. The aldehyde is oily, whereas its semi-carbazone melts at 209° C.

1 part of the resulting aldehyde of Formula VII

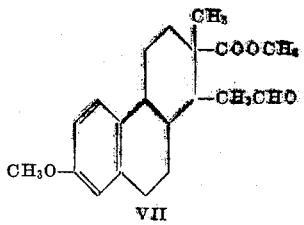

VII is reduced at 190–200° C. in a mixture of 50 parts by volume of triethylene glycol, 2.5 parts of sodium and 0.23 part of hydrazine hydrate. The reaction mixture is then poured into water, and the alkaline solution is extracted with ether in order to remove neutral by-products. By acidification of the aqueous solution 7-methoxy-1 - ethyl - 2 - methyl - 1:2:3:4:9:10:11:12:-octahydrophenanthrene - 2 - carboxylic acid is precipitated. The latter is taken up in ether, the ethereal solution is dried and evaporated. The crude acid is purified either by recrystallization or preferably by way of its methyl ester. After hydrolysis of the purified methyl ester the pure carboxylic acid is obtained in the form of thick platelets melting at 192–193° C., which can be readily converted by heating with an excess of pyridine hydrochloride into the free dextrorotary 7 - hydroxy - 1 - ethyl - 2 - methyl-1:2:3:4:9:10:11:12 - octahydrophenanthrene - 2-carboxylic acid, namely doisynolic acid melting at 196-198° C. of Formula VIII

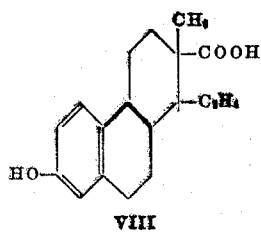

VIII

*Example 4*

$\Delta^{14}$ - 7 - acetoxy - 2:13 - dimethyl - 2 - carbomethoxy - hydrophenanthryl - (1) - acetic acid melting at 167° C. of the Formula IX

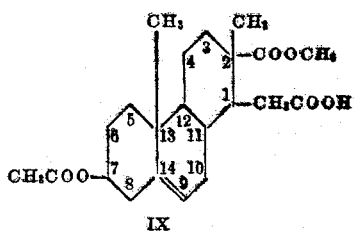

IX (namely $\Delta^5$-3-trans-acetoxy-etio-bilienic acid mono-methyl ester, obtained for example by the partial hydrolysis of $\Delta^5$-3-trans-acetoxy-etio- bilienic acid dimethyl ester prepared by Wettstein, Fritzsche, Hunziker and Miescher, Helvetica Chimica Acta, vol. 24, page 351E [1941], and subsequent acetylation) is converted by the methods described in Examples 1–3 into the corresponding acid chloride melting at 135° C. of the Formula X

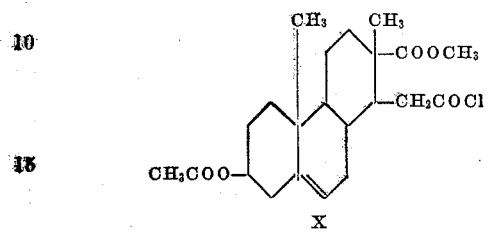

X 1.2 parts of the acid chloride dissolved in 15 parts by volume of toluene are reduced to the aldehyde by means of hydrogen at a raised temperature in the presence of 0.6 part of palladium-animal charcoal. After about 1½ hours the splitting off of hydrogen chloride practically ceases. The catalyst is removed by filtration, the filtrate is diluted with ether and unchanged carboxylic acid is removed by extraction with a dilute solution of sodium bicarbonate. The dried ethereal solution is then evaporated and the residue is purified by recrystallization from dilute methanol. In this manner $\Delta^{14}$-7-acetoxy-2:13-dimethyl-2-carbomethoxy - hydrophenanthryl-(1)-acetaldehyde of the Formula XI

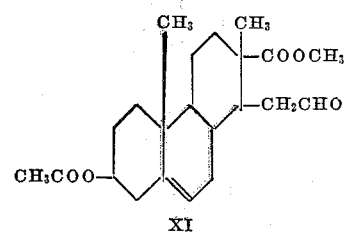

XI is obtained in excellent yield in the form of small needles melting at 125° C.

9 parts of the latter compound are heated with a mixture of 220 parts by volume of ethylene glycol, 12.5 parts of sodium and 2 parts of hydrazine hydrate for 20 hours at 180–190° C. After being cooled the reaction solution is poured into water, mixed with hydrochloric acid, the resulting precipitate is taken up in ether, and the ethereal solution is extracted with a very dilute solution of sodium carbonate. $\Delta^{14}$-7-hydroxy-1-ethyl-2:13 - dimethylhydrophenanthrene-2- carboxylic acid of the Formula XII

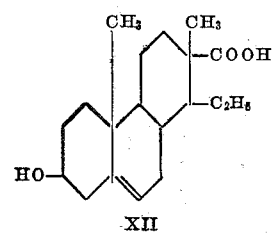

XII is precipitated from the alkaline solution by the addition of mineral acid. When recrystallized from dilute methanol the product is obtained in the form of long needles melting at 204–206° C.

Example 5

1.3 parts of 7-methoxy-2-methyl-2-carbomethoxy-1:2:3:4:9:10:11:12 - octahydrophenanthryl-(1)-acetic acid melting at 99–100° C. of the Formula XIII

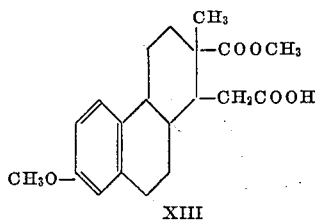

XIII (obtained, for example, by the oxidative splitting of the lumiestrone methyl ether of A. butenandt, Berichte der Deutschen Chemischen Gesellschaft, vol. 74, page 1308 [1941], by means of potassium hydroxide, esterification of the dicarboxylic acid with diazo-methane and semi-hydrolysis of the dimethyl ester melting at 90° C.) are converted into the acid chloride melting at 95–100° C. by means of oxalyl chloride as described in Examples 1–4. The resulting acid chloride is reduced in 30 parts by volume of xylene by passing hydrogen therethrough in intimate contact with 0.6 part by weight of 10 per cent. palladium-animal charcoal to yield 7-methoxy-2-methyl-2-carbomethoxy-1:2:3:4:9:10:11:12 - octahydrophenanthryl-(1)-acetaldehyde of the Formula XIV

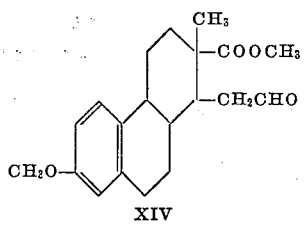

XIV

The aldehyde melts at 90.5–91° C., and with semicarbazide yields a semi-carbazone melting at 171–173° C.

0.8 part of the semi-carbazone is heated in a mixture of 0.8 part of sodium and 10 parts by volume of methanol for 12 hours in a bomb tube at 190–200° C. The whole is then poured into water, traces of neutral oil are removed by extraction with ether, the free 7-hydroxy-1-ethyl-2 - methyl-1:2:3:4:9:10:11:12 - octahydrophenanthrene-2-carboxylic acid of the Formula XV

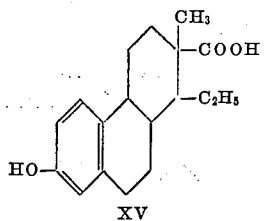

XV is precipitated by means of dilute hydrochloric acid. The product is a stereoisomeric form of the acid of Example 3 and crystallises from dilute methanol in the form of small needles melting at 151–153° C. Esterification with diazomethane, and subsequent treatment with dimethylsulphate in caustic soda solution yields the ether-ester melting at 109° C.

Example 6

5 parts of 7 - methoxy - 2 - methyl - 2 - carbomethoxy - 1:2:3:4 - tetrahydrophenanthryl - (1)-propionic acid methyl ester (cf. Bachmann, Journal Am. Chem. Soc., vol. 62, page 824 [1942]) are refluxed for several hours in a mixture of 50 parts by volume of methanol, 5 parts by volume of water and 5 parts of potassium carbonate. The whole is then poured into water and traces of unhydrolysed starting material are removed by means of ether and the clear alkaline solution is then acidified and the precipitated reaction product is taken up in ether. After washing and drying, the ethereal solution is evaporated. The residue crystallizes from methanol in lamellae of melting point 120–122° C. and is the 7 - methoxy - 2 - methyl - 2 - carbomethoxy - 1:2:3:4 - tetrahydrophenanthryl - (1) - propionic acid of Formula XVI

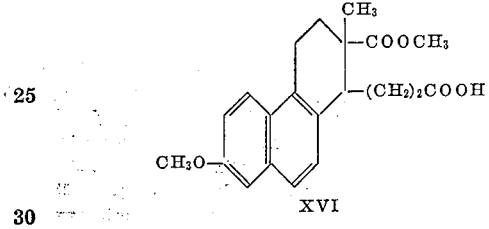

XVI 1.5 parts of this semi-ester are converted by means of oxalyl chloride into the crude acid chloride which melts at 95–100° C. and which latter is reduced with a stream of hydrogen passed through it in the presence of 0.75 part of 10 per cent. palladium-animal charcoal in 30 parts by volume of xylene at 100° C., to form the aldehyde of Formula XVII, and of melting point 99–101° C.

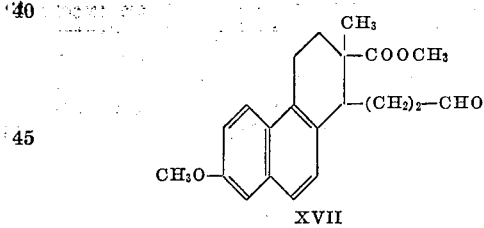

XVII 0.4 part of this aldehyde is dissolved in 5 parts by volume of toluene and boiled for 24 hours in the presence of a mixture of 3 parts by volume of amalgamated zinc, 9 parts by volume of hydrochloric acid and 3 parts by volume of water. After cooling, the whole is taken up in ether, washed with a dilute solution of caustic soda and with water and then evaporated. In order to remove the carbinol which has been formed in the reaction, the crude product is heated with a mixture of 5 parts by volume of pyridine and 0.5 part of succinic acid anhydride. After diluting with ether and removing the pyridine by means of dilute hydrochloric acid and the acid reaction products by means of a dilute solution of sodium carbonate, the ether is distilled off. The colored oily residue is dissolved in a 1:1 mixture of benzene and petroleum ether and filtered through a column of 5 parts of aluminium oxide. The colorless filtrate is evaporated to dryness to obtain 0.2 part of 7-methoxy-1-propyl-2-methoxy-2 - carbomethoxy - 1:2:3:4 - tetrahydrophenanthrene of Formula XVIIIa in the form of a viscous oil. The ester is hydrolysed with a strong alcoholic solution of caustic potash to form the 7 - methoxy - 1 - propyl - 2 - methyl - 1:2:3:4 - tetrahydrophenanthrene - 2 - carboxylic acid of formula XVIIIb, melting at 207–208° C.

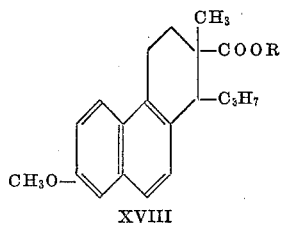

XVIII a: R=CH₃ b: R=H

The 7-hydroxyhydrophenanthrene-2-monocarboxylic acids obtained as described in the preceding examples may be converted into the corresponding 7-acyloxy- or 7-alkoxy- and/or 2-carbalkoxy-compounds, for example, into the acetate, propionate, butyrate, benzoate, methyl- or ethyl-ether or methyl- or ethyl-ester. Furthermore, water-soluble salts, such as alkali, alkaline earth metal or ammonium salts, may be prepared from the free hydroxymonocarboxylic acids or the hydroxymonocarboxylic acids esterified or etherified at the 7-hydroxy-group.

Having thus described the invention what is claimed is:

1. The hydrophenanthrene - (1) - lower alkanals which contain in the 2-position a lower alkyl group and also a —COO-lower-alkyl group, and in the 7-position a lower-alkoxy group.

2. The 7-methoxy-2-methyl-2-carbomethoxy-1:2:3:4 - tetrahydrophenanthryl - (1) - acetaldehyde.

3. The 7-methoxy-2-methyl-2-carbomethoxy-1:2:3:4 - tetrahydrophenanthryl - (1) - propionaldehyde.

4. The 7-methoxy-2-methyl-2-carbomethoxy-1:2:3:4:9:10:11:12 - octahydrophenanthryl - (1)-acetaldehyde.

KARL MIESCHER.
JULES HEER.

REFERENCES CITED

The following references are of record in the file of this patent:

UNITED STATES PATENTS

| Number | Name | Date |
|---|---|---|
| 2,276,543 | Miescher | Mar. 17, 1942 |

OTHER REFERENCES

Clemmensen; Berichte, vol. 47, pp. 51–63 (1914).

Griffing; Jour. Organic Chem., 11, 123–135 (1946).